United States Patent [19]

Brandenburg et al.

[11] Patent Number: 5,142,823
[45] Date of Patent: Sep. 1, 1992

[54] SWINGING-SLIDING DOOR FOR VEHICLES

[75] Inventors: Rudolf Brandenburg; Horst Goldbach, both of Ratingen, Fed. Rep. of Germany

[73] Assignee: Kiekert GmbH, Fed. Rep. of Germany

[21] Appl. No.: 532,377

[22] Filed: Jun. 4, 1990

[30] Foreign Application Priority Data

Jun. 2, 1989 [EP] European Pat. Off. ........... 89109987

[51] Int. Cl.[5] ............................................. E05F 17/00
[52] U.S. Cl. ....................................... 49/118; 49/123; 49/218
[58] Field of Search ................. 49/118, 123, 210, 212, 49/218, 219, 220, 116

[56] References Cited

U.S. PATENT DOCUMENTS

| 1,916,480 | 7/1933 | Jacobson | 49/118 X |
| 3,994,094 | 11/1976 | Marzocco | 49/218 X |
| 4,087,939 | 5/1978 | Elguindy et al. | 49/118 |
| 4,091,570 | 5/1978 | Favrel | 49/118 |
| 4,543,746 | 10/1985 | Racca | 49/118 |
| 4,674,231 | 6/1987 | Rader et al. | 49/118 |

FOREIGN PATENT DOCUMENTS 2125870  3/1984  United Kingdom ................. 49/220

Primary Examiner—Philip C. Kannan
Attorney, Agent, or Firm—R. H. Siegemund

[57] ABSTRACT

A swinging-sliding door for vehicles, particularly for passenger vehicles, includes two door leaves positioned outside and within the wall of the vehicle in a closed state. For the door, a driving device for operating the door leaves includes pivotable, roller carrying levers which swing the door leaves from the closed position into a ready-to-open position; in addition, the driving device exerts a reaction force onto the pivotable roller carrying levers which, in closed position, results in locking them, a driving device includes a single electromotor and gearing unit positioned laterally above the opening of the door, further having a case and a driving pulley, a traction belt is guided through a deflection pulley and couples the drive pulley to the door leaves via the roller carrying levers; the case has a flange carrying an eccentric control pin engaging a control lever fastened to a door post carrying the pivotable roller-carrying lever, and the control pin in a door closing position being held in a dead center position in a curved contour of the control lever so that the door is safely locked and can neither be opened manually nor by forces of the wind.

9 Claims, 5 Drawing Sheets

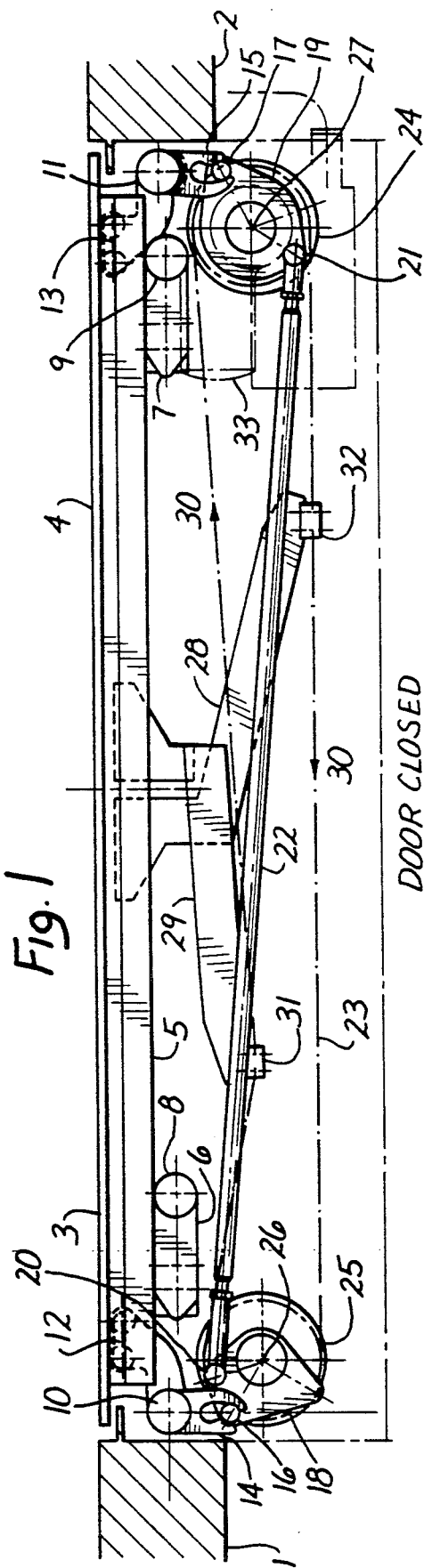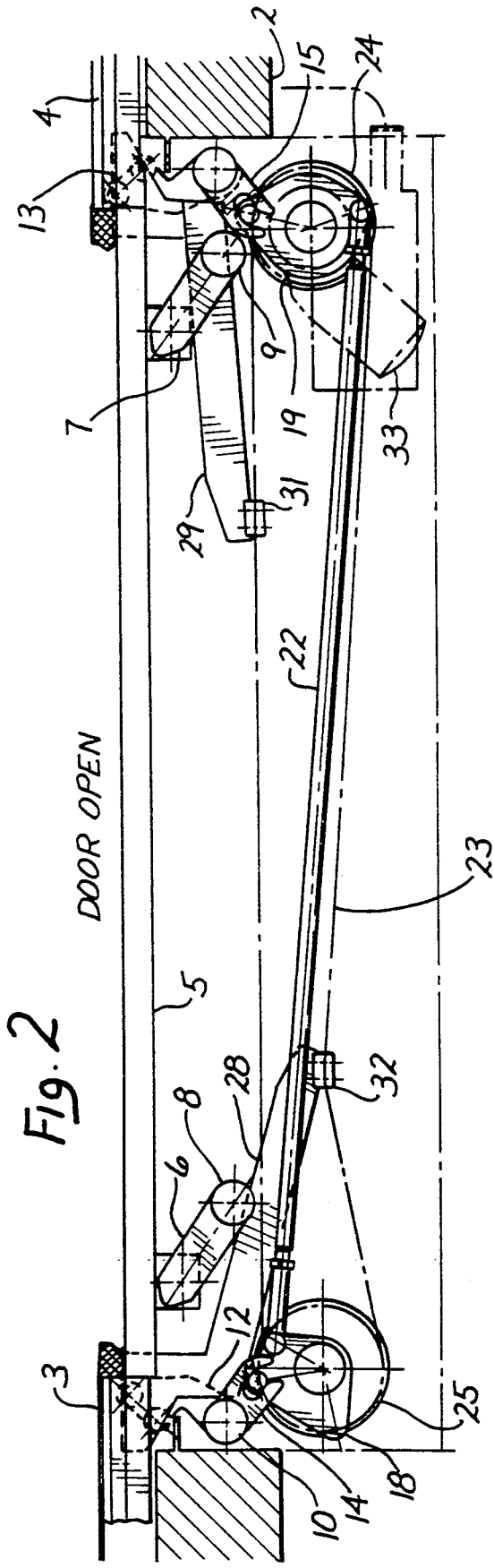

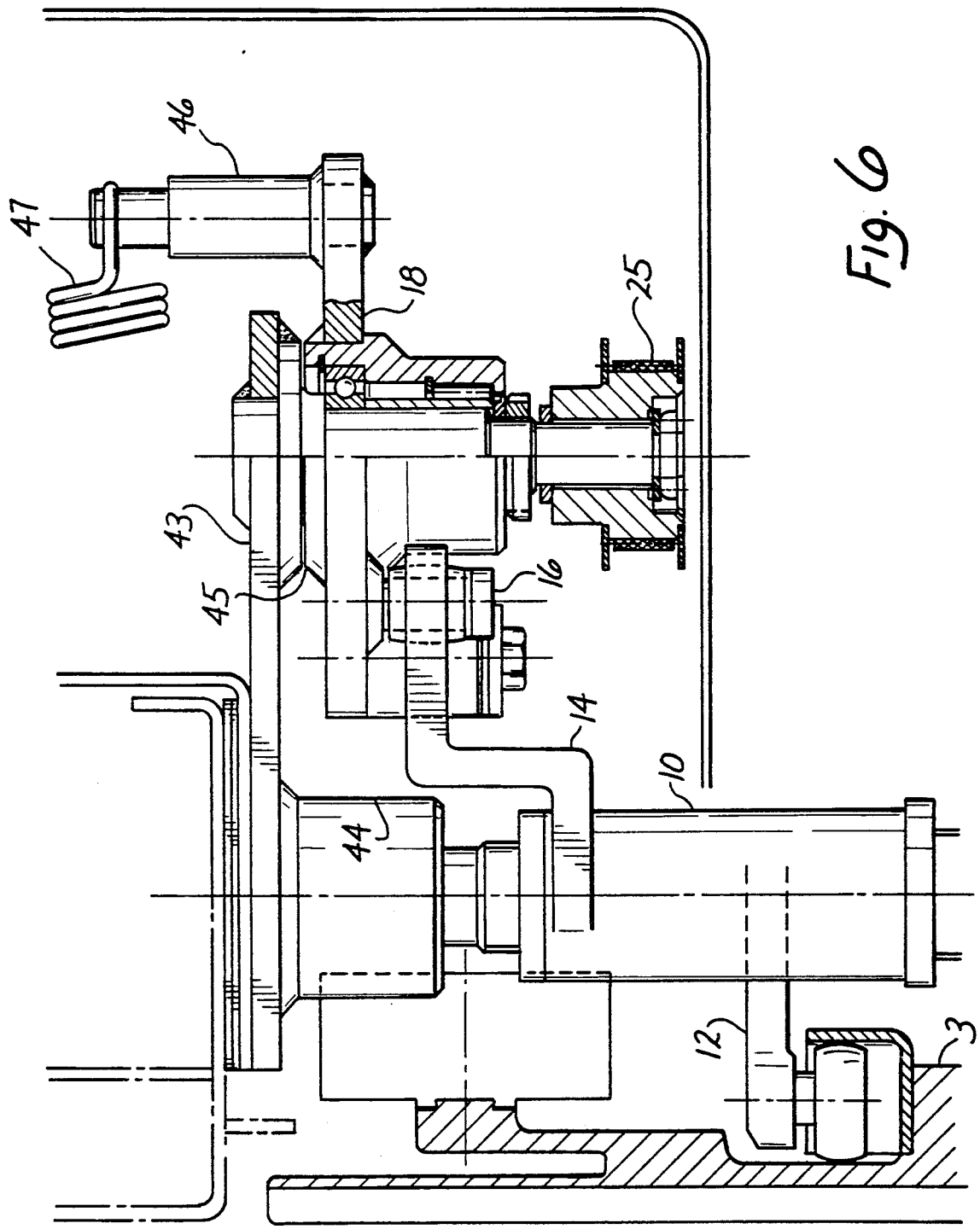

SWINGING-SLIDING DOOR FOR VEHICLES

BACKGROUND OF THE INVENTION

The present invention relates to a swinging-sliding door for vehicles, primarily for passenger vehicles, comprising one or two door leafs positioned within the wall of the vehicle when closed, and outside in front of the wall when open; the door leaves are guided on telescopic guide rails and are operable by means of a driving device, which is comprised of swivelling driving levers swinging the door leafs from a closed position into a ready-to-open position, and wherein, further, the driving device exerts a counter-force onto these swiveling levers, which, in a closed positon, results in the blocking of the swinging levers.

DT-OS 36 30 229 describes a swinging-sliding door of the above described kind, wherein the door leave are moved as well as locked in closed position by means of a pneumatic cylinder. Locking is effected by the cylinder bottom acting upon an angular lever which, via a swiveling lever provided with a radial cam, swings the door leaf in and out and, in closed position, blocks it. Starting at the angular lever, a coupling rod is led to the opposite door leaf where a corresponding lever arrangement controls the second leaf of the door. If the compressed air supply fails, the door remains locked. Thus, an additional emergency lever is provided which mechanically releases the lock.

Vehicles used for the conveyance of passengers are very frequently equipped in such a way that all control devices and accessory units may be driven only by electrical current.

DESCRIPTION OF THE INVENTION

It is an object of the present invention to transform a pneumatically driven swinging-sliding door in such a way that it can be moved and locked by means of a particularly simple electric drive.

It is a further object of the present invention to provide a low cost emergency release in the case of a break down of the electric network.

According to the preferred embodiment of the present invention the objects are achieved in that an electromotor-gear unit is positioned laterally above the opening of the door and serves as a driving device, the driving gear of that unit drags along the wing, wings, or leafs of the door by means of a traction mechanism guided through a deflection roller, a case flange of motor housing carries an eccentric control pin which controls a swiveling lever positioned on the revolving post of the door, whereby the revolving post at its top and at its bottom carries roller levers which support rollers which in turn run on guide rails at the side of the door, whereby further in the closed position of the door the control pins off center position relative to the motor swivel axis extends at right angles, or nearly so to the control path of the swiveling control lever establishing thus a dead center position so that the door is safely locked and neither be opened manually nor by external forces such as wind.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 is a top view of the drive system of a two-wing or two leaf swinging-sliding door; the door is shown in a closed position;

FIG. 2 shows the same arrangement of FIG. 1 but in an open position;

FIG. 6 shows a view of the interior of the drive mechanism of the left of the door.

Figure 3:
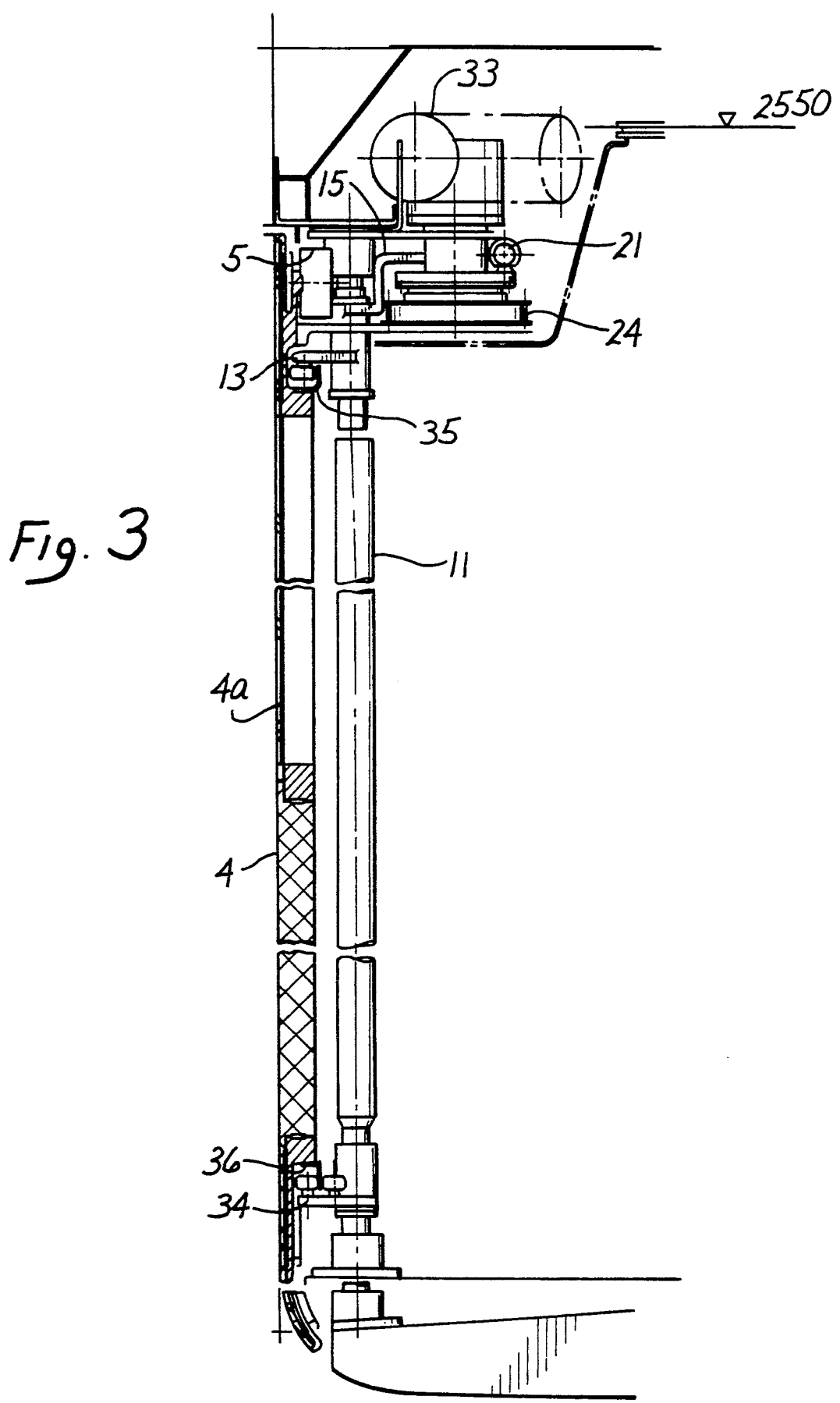
FIG. 3 shows in reduced form a section through the door with a view of the geared motor in the roof region.

Before proceeding to the detailed description of the drawing, a summary list of components is given:

LIST OF REFERENCE NUMBERS

1—left door frame
2—right door frame
3—left door lead or panel
4—right door lead or panel
5—telescopic rail
6,7—swiveling arms
8,9—bearing bolts
10,11—door pillars
12,13—swiveling levers carrying rollers
14,15—control levers p0 16,17—control pins
18,19—flanges
20,21—spherical heads
22—coupling rod
23—traction means
24—driven pulley
25—deflection pulley
26,27—rotational axis
28,29—pulling arms
30—arrows
31,32—clamping devices
33—electromotor
34—lower swiveling lever
35,36—guide rails
37—worm gear
38—driven shaft
39—base metal sheet
40—electromagnetic coupling
41—arm
42—pin
43—base plate
44—bearing
45—end shield
46—pin
47—helical spring
48,49—Bowden cables Proceeding now to the detailed description of the drawings, particularly FIG. 1 and 2, reference numeral 1 represents a left and 2 a right door frame. Between them there is the left door leaf or panel 3 and the right door leaf or panel 4. Immediately behind the door leaves there is a continuous telescopic rail 5. This rail is suspended from swiveling arms 6,7 which are connected to the main door support in the roof region by means of bearing bolts 8,9.

Next to door frame parts 1,2, door pillars 10,11 are placed carrying pivoted, roller carrying levers 12,13. In addition one can recognize slotted control levers 14,15. The respective slots establish curved control paths in which slide and which are in engagement with control pins 16,17. These pins 16 and 17 are placed on pivotable flanges 18,19 which additionally carry spherical heads 20,21. Both spherical heads are connected to each other by means of an adjustable coupling rod 22. If the flange 19 is rotated counterclockwise around a limited angle, flange 18 is drawn along in the clockwise direction. As a result, levers 14,15, door pillars 10,11, and swivelling, roller carrying levers 12,13, are swung in the opposite direction whereby door leaves or panels 3,4 and the telescopic rail 5 connected thereto are moved out of the vehicle body plane as shown in FIG. 2.

Subsequently, door leaves 3,4, can be pushed into the opening direction until the state shown in FIG. 2 is reached, i.e. until the door is completely open. The actual opening and closing movement is carried out by a traction mechanism 23 marked in dash-dot pattern; this mechanism is guided by a driven pulley 24 and a deflection pulley 25.

components 18 and 25 are moving around the same rotational axis 26; they are, however, not coupled to each other. The same may be applied to components 19,24, and axis 27. Traction mechanism 23, which preferably is a slippage-free synchronous belt, is firmly connected to the door leaves or panels via inclined pulling arms 28,29, both pulling arms spatially crossing each other. If the pulleys 24,25 are rotating clockwise, the traction mechanism 23 is moving in the direction of arrows 30 so that both door leaves 3,4, will open.

A comparison of FIGS. 1 and 2 reveals that traction arms 28,29 do not only move sideways, basically on a line, but are swiveled outside by a distance that corresponds to the thickness of the door leaf. In this connection, traction mechanism 23 is subjected to a certain deformation and extension which can particularly be recognized as regards the clamping device 31 in FIG. 1, and the clamping device 32 in FIG. 2. Pulling arms 28,29 are preferably configured in such a way that each of the clamping devices 31,32 move in a commensurable path respectively to the left and to the right with respect to the center plane of symmetry of the door, i.e. of the two panels or leaves. In this manner and by the appllication of a deflection pulley 25 that is considerably smaller than driven pulley 24, the elongation of the traction mechanism 23 is reduced to a minimum.

Swinging and sliding as described above are effected solely by one driving device, the principle component of which is an electromotor 33, being preferably an elecronically controlled dc motor. The motor is shown in dash-dot lines in FIGS. 1 and 2 but fully drawn in FIG. 3. The motor is drivingly connected to a worm gear. The driven axis of the gear coincides with axis 27. The housing of the motor-gear unit is firmly connected to flange 19, and is thus pivotable about axis 27 to a limited extent. If a voltage is applied to the motor 33 a certain torque results at its driven pulley. The torque acts clockwise starting from the closed door position in accordance with FIG. 1. However, at the same time a commensurate load moment is exerted on the gear housing and thus on the flange 19. The load moment tries to rotate flange 19 and flange 18 as well, also in a counterclockwise direction.

Figure 5:
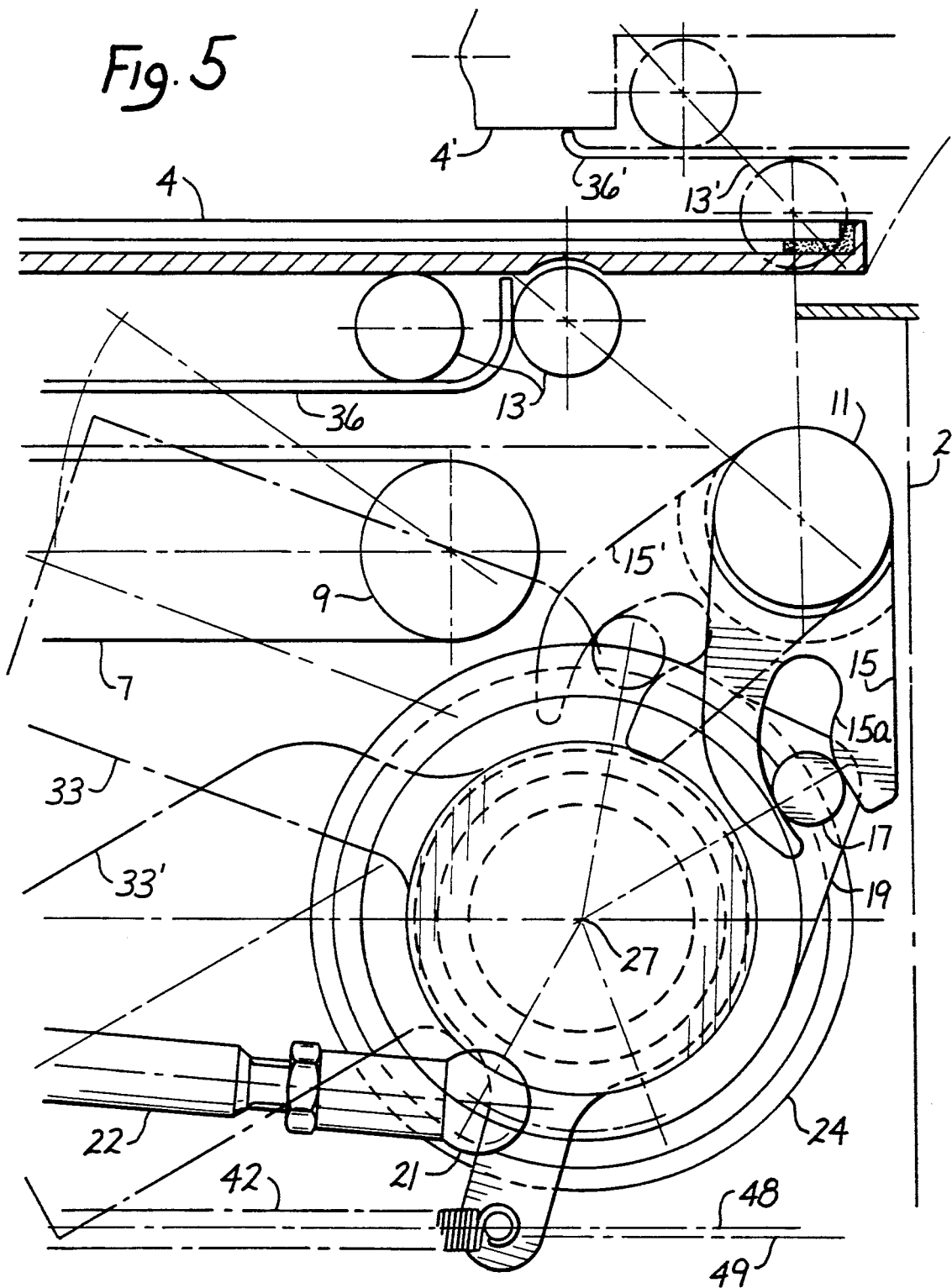
FIG. 5 illustrates the kinematics during swinging out and locking of the right door leaf.

As long as the door leaves 3,4 are not yet swung out, no translatory movement will occur. Consequently, the load moment must at first rotate the motor 33 counterclockwise by approximately 45°. At the same time, control pin 19 pushes the control level 15 to the left. This is shown in FIG. 5 wherein the level 15 is shiftd from the fully drawn position to the dash dot position. The pivoted, roller carrying lever 13 turns to the right as can be seen by comparing FIG. 1 with FIG. 2. The same process is followed in the opposite order at the left hand door frame 1 so that both of the door leaves 3,4 and the telescopic rail 5 as well may swing outwardly.

FIG. 3 shows in shortened form a vertical section through the door with a view of motor 33 and the gear connected thereto. The drive pulley 24, and the spherical head 21 as well as the control lever 15 are also shown here. The door leaff 4 with an inserted window 4a is represented in cross-section. The door post 11 is supported in the bottom and roof region and bears, in addition to the control lever 15, the upper swiveling roller lever 13 and a lower swiveling roller lever 34. The respectively associating guide rails 35,36 are inserted into recesses of door leaf 4.

Figure 4:
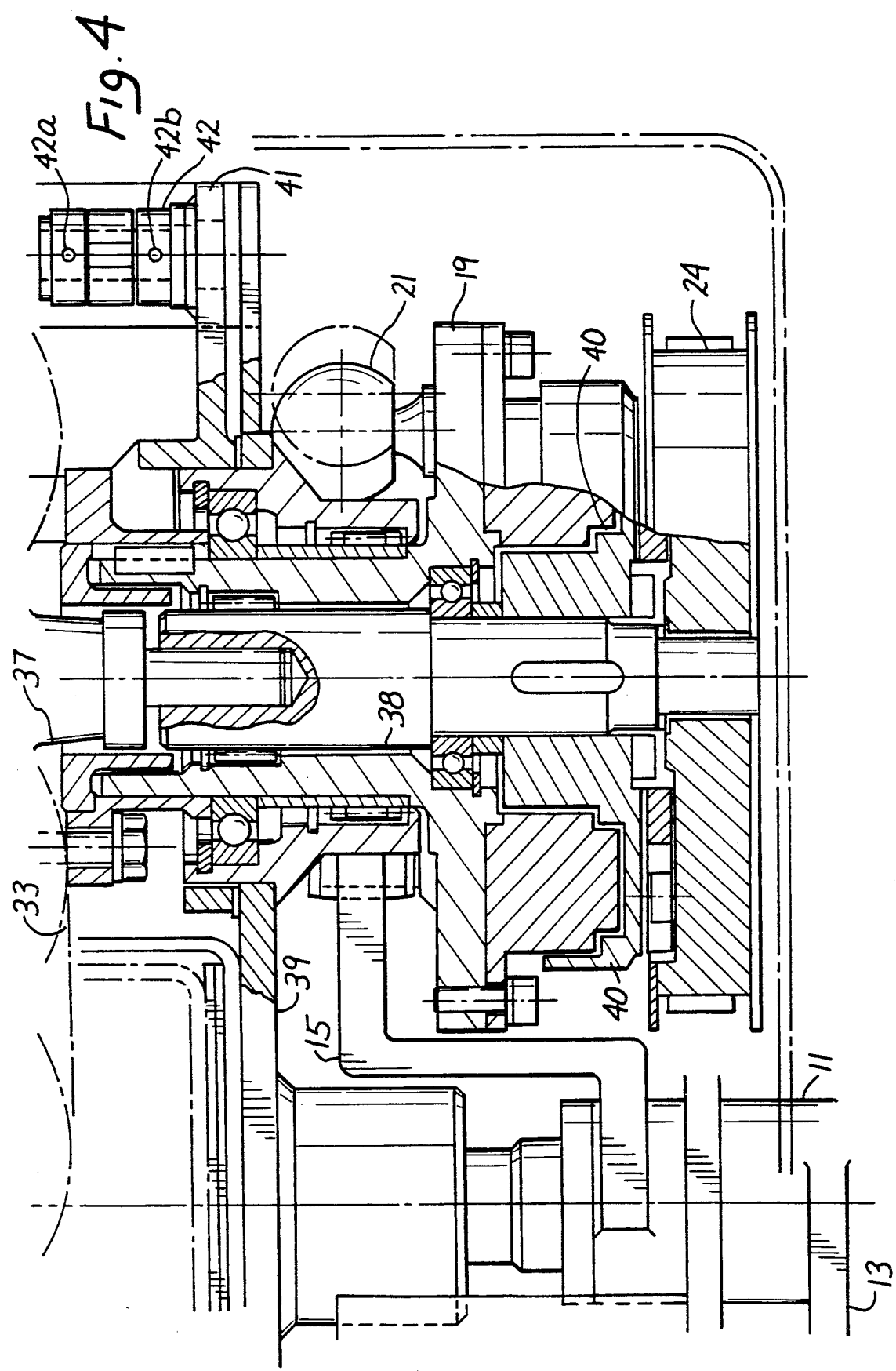
FIG. 4 shows a section through the motor-gear unit.

FIG. 4 represents the motor-gear unit in cross-section. At the left edge one sees door post 11 with pivoted roller carrying lever 13 and control lever 15 with an offset configuration of twice a right angle. The electric motor 33 acts upon drive shaft 38 via a worm gear 37. The shaft is connected to the drive pulley 24. The motor gear unit is suspended from a base sheet metal 39. An electromagnetic coupling 40 is positioned between drive shaft 38 and drive pulley 24 so that the pulley 24 can transmit any torque only if the coupling 40 is energized. On flange 19 there is fixed the spherical head 21 which permits the transmission of any swiveling of the motor gear unit upon the other leaf of the door. In addition, a pin 42 is fixed to an arm 41 which pin may receive the metal ropes of Bowden cables for an emergency release via cross bores 42a, 42b.

FIG. 5 is a top view of the control elements of the right door leaf. The fully drawn lines illustrate the position of the parts when the door is closed. The open position is marked in dash-dot pattern. Control lever 15 exhibits particularly a curved control slot 15a. In closed position, of the door leaves or panels control pin 17 being on a portion of the radial cam, which is on a particular radial line from the axis 27. That radial line is at right angles to that portion of the track slot 15a in which the pin 17 then rests. This means that a clockwise torque exerted by the rotational post 11 upon the lever 15 cannot exert any tangential force on the pin and the flange 19. In other words, the control lever 15 is in a dead center position which, when the door is closed, can neither be overcome by pulling nor by dragging on the door leaf 4. The door is thus safely locked. This state is additionally supported by a helical spring 42.

In order to commence opening of the door, the motor 33 is started in the opening direction. At the same time, the electromagnetic coupling 40 is activated. Since, however, the driven pulley 24 cannot yet move due to the locking of the door leaf, the load moment is transmitted to the motor-gear unit. Hence the entire unit swivels in a counter-clockwise direction (Transition from FIG. 1 to FIG. 2) and by this motion pin 17 places the control lever 15 into position 15' as shown in FIG. 5. The post 11 rotates clockwise and adjusts pivoted roller carrying lever 13 into position 13'. Consequently the door leaf 4 is swung into a position out of and in front of the body plane and frame part 2 (see right hand side of FIG. 2). Due to this swinging out of the door panel or leaf 4 it can be pushed open in parallel direction to the body plane by the drive pulley 24 via traction mechanism 23.

The left door leaf 3 is unlocked and driven in the same way via coupling rod 22, as shown in FIG. 6. In this figure a base plate is provided in or near the roof of the vehicle, which plate carries support 44 of door post 10, and bearing shield 45 for the pivotable flange 18 and the deflection pulley 25. A control pin 16 an another pin 46 are fixed on flange 18. A helical spring 47 is fastened to pin 46. The diameter of the deflection pulley 25 is considerably smaller than that of drive pulley 24.

A belt is preferably used as a traction device, in order to permit slippage-free transmission of forces whereby the drive pulley and the deflection pulley exhibit corresponding indentations for engaging the belt. In this manner, the movement of the two door leaves may be absolutely synchronized, even after a long time of use.

The opening of the door in the case of an emergency must be guaranteed even if the electric motor malfunctions or if the power supply fails. Before the door can be opened manually it must first be unlatched. This unlocking is performed by an inner and an outer Bowden cable which turns the flange 19 with the motor-gearing unit to the left side and thus frees the control lever or levers from the dead center position. At the same time the pivoted roller carrying levers press the door leaves out of the door plane so that they can be pushed open manually. Since the electromagnetic coupling is disengaged in the absence of current, the drive pulley runs easily and freely. In case the door is opened or closed manually, it is sufficient to push open one door leaf only; the other one is dragged along by the belt.

If a slow speed electromotor having a high torque is used, the self-locking worm gear and the electromagnetic coupling may be omitted. In case of an electric motor with bevel gear, the coupling may also be omitted.

The novel swinging-sliding door can advantageously be employed in all rail vehicles as well as in road vehicles. In order to operate a one or a two wing or leaf sliding door, utilization of a single an electromotor suffices. the power supply of the motor can be efected by the existing direct-current system which is present anyway for control purposes. This motor serves for both moving the door as well as locking of the door in a surprisingly simple manner. It is understood that the specification and the example are illustrative but are not limitations in the practicing of the present invention and that other embodiments within the spirit and scope of the invention will suggest themselves to those skilled in the art.

We claim:

1. A swinging-sliding door for vehicles, particularly passenger vehicles, each such vehicle having a wall structure, and door posts comprising:

a telescopic guide rail means (5) mounted by means of sviwel arms (6,7) to the wall structure, and being provided for holding the rail means when moving into and out of the wall structure;

at least one door leaf positioned for being outside and within the wall of the vehicle, respectively in an open and in a closed state for the door, said leaf being guided by the guide rail means for moving along the wall when the door is moved into the open state;

additional top and bottom rails (35,36) on the door leaf;

a driving device for operating the door leaf, the driving device including at least one pivotable, roller carrying lever mounted on one of the door posts said lever swings the guide rail means and the door leaf from the closed position of the door leaf into a ready-to-open position that is into a plane outside the wall structure as the rollers run in the additional rails, the driving device including an electro-motor (33) and gearing unit (37) and a drive pulley connected to the gearing unit for being driven by the gearing unit when the motor runs, the motor and gearing unit being positioned laterally above the opening of the door, the driving device further having a case which turns as a result of reaction when the motor runs, a traction means also included in the driving device and being connected to the pulley and being guided through a deflection pulley and connected to the door leaf for thereby drivingly coupling the drive pulley to the door leaf for shifting the leaf along the wall on turning of the drive pulley;

said case having a flange carrying an eccentric control pin and turning the pin on turning of the flanges as a result of the reaction when the motor runs a control lever fastened to the door post, the control lever having a slot of a curved contour engaging the pin so that upon turning of the flange the pin moves the control lever which in turn turns the post to thereby pivot the roller carrying lever; and said control pin (16,17) in a door closing position being held in a dead center position in the curved contoured control lever so that the door is safely locked and can neither be opened manually nor by forces of the wind, the driving device through the flange exerting a reaction force onto the control lever which for a door opening results in the reaction force and turning of the pin and of moving the control lever to thereby unlock the lever so that the door leaf is permitted to be moved out of the plane of the wall permitting further sliding opening of the door through the traction means.

2. A swinging-sliding door according to claim 1 wherein in the case of a two-wing door the traction means includes two pulling arms and further flange (18) on the deflection pulley is pivoted next to a second door post (10), which further flange carries another control pin (16) engaging in another control lever (14) being connected to the second door post (10) for pivoting the same, and wherein between both flanges (18, 19) there is positioned a coupling rod (22) effecting a reverse control motion of the further flange (18) and thereby locking the second door leaf (3), too.

3. A swinging-sliding door according to claim 1 wherein the driving device includes a self-locking worm gear (37).

4. A swinging-sliding door according to claim 3, there being an electromagnetic coupling positioned between the gear and the drive pulley so that the drive pulley can run freely in case of an emergency.

5. A swinging-sliding door according to claim 1 there being two door leaves (3,4), said leaves in the swungout position are driven synchronously and free of slippage through a toothed belt included in the traction means (23) the drive pulley and the deflection pulley are toothed disks.

6. A swinging-sliding door according to claim 5 wherein the traction means includes pulling arms (28, 29) being positioned between the door leaves and the toothed belt at an angle of less than 45 degrees so that the distance between the toothed disks and the working points of the traction arms enlarges.

7. A swinging-sliding door according to claim 6 pulling arms (28, 29) being connected to clamping device (31, 32) said clamping devices travelling a commensurate path at the left and the right of the plane of symmetry of the two door leaves.

8. A swinging-sliding door according to claim 1 wherein the flange (19) supports a gear (37) and said motor is provided with an arm being connected to a Bowden cable.

9. A swinging-sliding door according to claim 1 wherein the traction means includes a toothed belt the deflection pulley and the drive pulley being toothed disks accordingly, the driven toothed disk exhibits a diameter which is approximately three times as much as that of the deflection toothed disk.

* * * * *